(12) United States Patent
Rama

(10) Patent No.: US 7,467,875 B1
(45) Date of Patent: Dec. 23, 2008

(54) LIGHTED TELESCOPING VIEWING APPARATUS

(76) Inventor: Hashim A. Rama, 1031 S. Main St., Jefferson, WI (US) 53549

( * ) Notice: Subject to any disclaimer, the term of this patent is extended or adjusted under 35 U.S.C. 154(b) by 93 days.

(21) Appl. No.: 11/566,733

(22) Filed: Dec. 5, 2006

(51) Int. Cl.
*F21L 4/04* (2006.01)

(52) U.S. Cl. .................. 362/198; 362/188; 362/572

(58) Field of Classification Search ............ 362/577, 362/187, 188, 197, 198, 199, 205, 206, 574, 362/573, 572, 561; 600/178, 179
See application file for complete search history.

(56) References Cited

U.S. PATENT DOCUMENTS

| | | | |
|---|---|---|---|
| 1,036,000 A | 8/1912 | Pease | |
| 3,554,721 A * | 1/1971 | Gardner | 65/409 |
| 3,582,638 A * | 6/1971 | Peters | 362/577 |
| 4,176,661 A * | 12/1979 | Schubert et al. | 600/121 |
| 4,225,907 A * | 9/1980 | Erdell | 362/255 |
| 4,580,198 A * | 4/1986 | Zinnanti, Jr. | 362/203 |
| 4,896,941 A * | 1/1990 | Hayashi et al. | 385/116 |
| 5,428,484 A | 6/1995 | Baker | |
| 5,615,920 A * | 4/1997 | O'Kane et al. | 294/65.5 |
| 6,432,046 B1 * | 8/2002 | Yarush et al. | 600/179 |
| 6,565,229 B2 | 5/2003 | Bliss | |
| 7,052,155 B2 * | 5/2006 | Gavin et al. | 362/120 |

* cited by examiner

*Primary Examiner*—Sandra L. O'Shea
*Assistant Examiner*—Gunyoung T. Lee
(74) *Attorney, Agent, or Firm*—Crossley Patent Law; Mark A. Crossley

(57) ABSTRACT

The lighted telescopic viewing apparatus inexpensively provides for visual acuity in viewing remote or distant objects is disclosed. The telescoping capability and direct object lighting further enhance viewing. The fiber optics provide for accurately transmitting light to viewed objects and images of viewed objects, respectively. Light and viewing is direct, and not a mirror image. The viewer on the apparatus case further provides a pivotal viewing field.

12 Claims, 3 Drawing Sheets

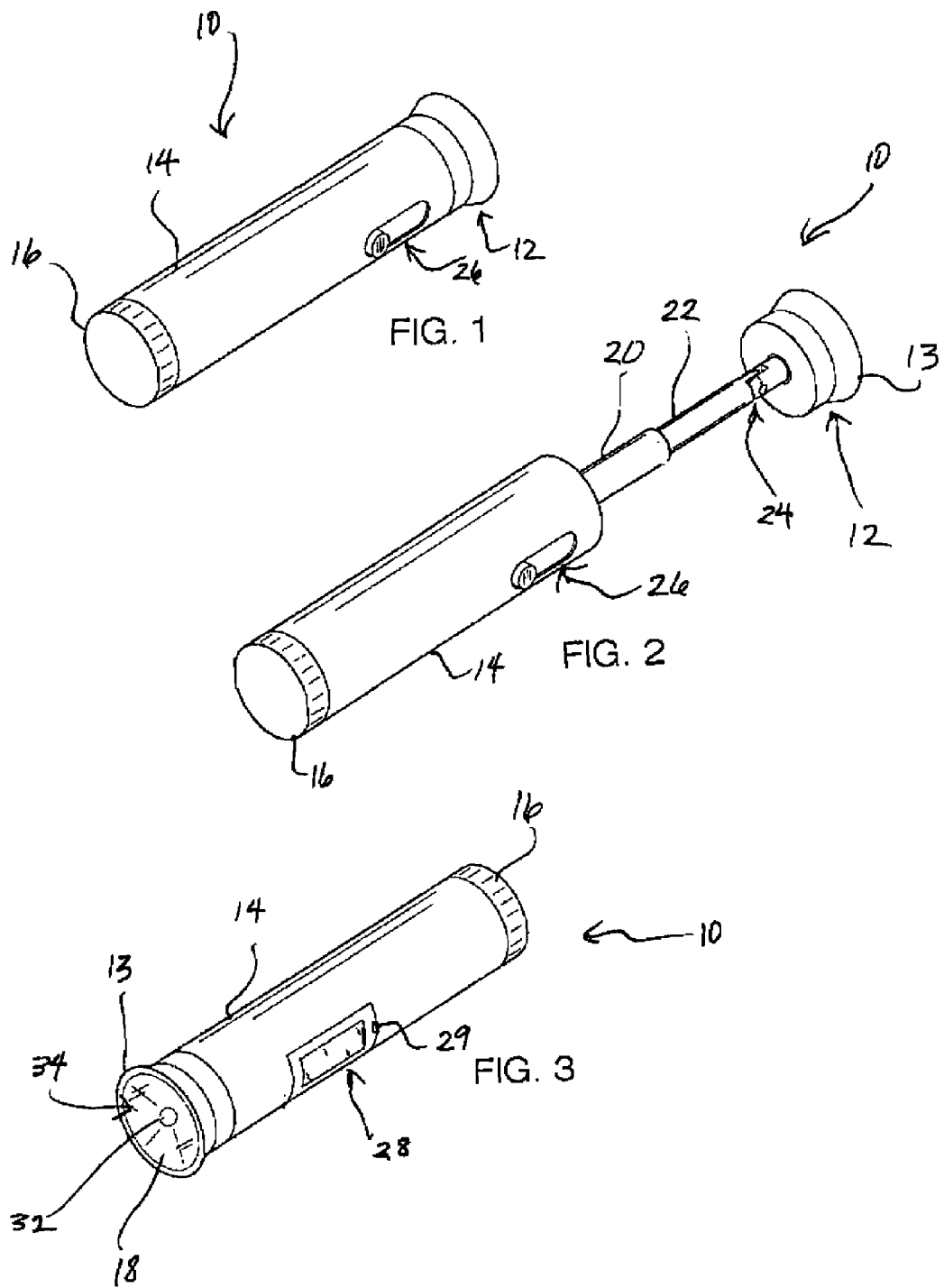

LIGHTED TELESCOPING VIEWING APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

In the past, viewing distant objects has been aided by small extending mirrors, extending lights and other commonly familiar devices. Such devices have well-known shortcomings, such as lack of sufficient light to the needed viewing field, and failure to provide sufficient visual acuity. Further, image reversal from the use of mirrors in prior art may be visually confusing. In highly technical fields, the viewing of distant objects is sometimes accomplished via bore scopes, which are expensive and often require technical skills for operation. A gap exists in that prior art fails to provide a device for accurately viewing distant objects or otherwise visually inaccessible objects which is inexpensive and which may be used without technical expertise. The current lighted telescoping viewing apparatus provides viewing capabilities with a light source proximal to the objects to be viewed, while also providing viewing transmission to a viewer on the object case. The present apparatus provides visual acuity not heretofore provided in an inexpensive device.

FIELD OF THE INVENTION

The lighted telescopic viewing apparatus relates to telescoping equipment and mirrors and, more especially, to a lighted telescoping viewing apparatus incorporating fiber optics and a pair of telescoping extensions, and a viewer on the flashlight case for remote viewing of the illuminated objects.

DESCRIPTION OF THE PRIOR ART

Prior related art U.S. Pat. No. 5,428,484 issued to Baker on 1995, Jun. 27 teaches a moveable hand-held lighted mirror. The device does not provide the localized light of the present apparatus, nor does the device provide remote, distant viewing capabilities. U.S. Pat. No. 1,036,000 issued to Pease on 1912, Aug. 20 teaches an illuminating device which telescopes. The device does not include the fiber optics and remote, distant viewing capabilities of the present apparatus. U.S. Pat. No. 6,565, 229B2 issued to Bliss on 2003, May 20 teaches a telescopic flashlight. The device does not have the remote viewing capabilities of the present apparatus.

While the above-described devices fulfill their respective and particular objects and requirements, they do not describe a lighted telescopic viewing apparatus that provides for the advantages of the lighted telescopic viewing apparatus. In this respect, the lighted telescoping viewing apparatus substantially departs from the conventional concepts and designs of the prior art. Therefore, a need exists for an improved lighted telescopic viewing apparatus.

SUMMARY OF THE INVENTION

The general purpose of the lighted telescopic viewing apparatus, described subsequently in greater detail, is to provide a lighted telescopic viewing apparatus which has many novel features that result in an improved lighted telescopic viewing apparatus which is not anticipated, rendered obvious, suggested, or even implied by prior art, either along or in combination thereof.

To attain this, the lighted telescopic viewing apparatus provides for viewing objects which are otherwise difficult or even impossible to view in a normal line of sight. The head of the apparatus is pivotal, whereby objects that are blocked from adequate lighting and viewing are visually accessible. Rather than providing mirrored viewing of objects, the fiber optics of the apparatus transmit images from the image receiver, which surrounds the fiber optic light discharge, to the viewer which is pivotally mounted on the case. With light provided at the head, object lighting is more definitively provided. Pivoting of the head of the apparatus further provides for direct lighting of the objects to be viewed. The head or the entire apparatus is moved closer or farther from an object to be viewed in order to focus the image receiver and lens. The telescoping extensions provide for visual reach. Chosen viewing angle for the user is further selective via the viewer, which can be viewed in a closed position which is parallel to the case, or in an outwardly pivoted position, or in any position therebetween. Further, the insertion of the telescoping extensions back into the case provide for the apparatus to be used as a more typical flashlight.

The apparatus, via the features above, provides for visual acuity in remote object viewing. The telescoping capability and direct object lighting further enhance viewing. The fiber optics provide for accurately transmitting light and images.

Thus has been broadly outlined the more important features of the improved lighted telescopic viewing apparatus so that the detailed description thereof that follows may be better understood and in order that the present contribution to the art may be better appreciated.

An object of the lighted telescopic viewing apparatus is to provide for viewing of objects that are otherwise difficult or impossible to view.

Another object of the lighted telescopic viewing apparatus is to provide lighted object viewing.

A further object of the lighted telescopic viewing apparatus is to provide pivotal light for viewing objects.

An added object of the lighted telescopic viewing apparatus is to provide targeted light of objects to be viewed.

And, an object of the lighted telescopic viewing apparatus is to provide a proximal view of objects remotely located.

Additionally, an object of the lighted telescopic viewing apparatus is to provide the above advantages and more, which will become evident, inexpensively.

These together with additional objects, features and advantages of the improved lighted telescopic viewing apparatus will be readily apparent to those of ordinary skill in the art upon reading the following detailed description of presently preferred, but nonetheless illustrative, embodiments of the improved lighted telescopic viewing apparatus when taken in conjunction with the accompanying drawings.

In this respect, before explaining the current embodiments of the improved lighted telescopic viewing apparatus in detail, it is to be understood that the lighted telescopic viewing apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved lighted telescopic viewing apparatus. It is therefore important that the claims be regarded as including such equivalent constructions insofar as they do not depart from the spirit and scope of the lighted telescopic viewing apparatus. It is also to be understood that the phraseology and terminology employed herein are for purposes of description and should not be regarded as limiting.

BRIEF DESCRIPTION OF THE DRAWINGS

FIG. 1 is a rear perspective view.
FIG. 2 is a rear perspective view with head partially telescoped from the case.
FIG. 3 is a frontal perspective view.

DETAILED DESCRIPTION OF THE DRAWINGS

Figure 4:
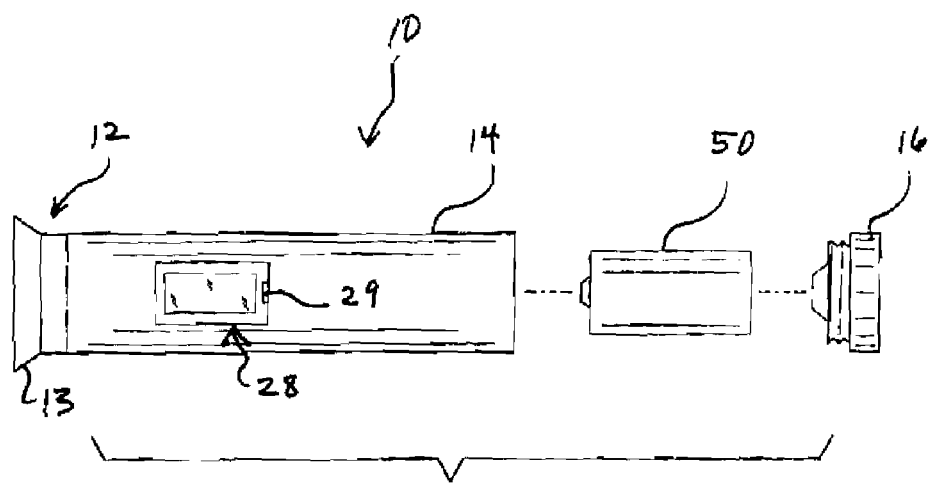
FIG. 4 is a partially exploded lateral elevation view.

With reference now to the drawings, and in particular FIGS. 1 through 6 thereof, the principles and concepts of the lighted telescopic viewing apparatus generally designated by the reference number 10 will be described.

Referring to FIGS. 1, 2, and 3, the lighted telescoping viewing apparatus 10 comprises a cylindrical case 14 having a first end, a second end, and a length therebetween. The externally accessible on/off switch 26 is disposed on the case 14. The externally accessible viewer 28 is disposed on the case 14. The viewer 28 is fitted with the tab 29 for ease in pivoting the viewer 28. More than one type of switch 26 is provided, in various embodiments of the apparatus 10. The preferred switch 26 is the sliding on/off switch 26. The first telescoping extension 20 is slideably affixed within the first end of the case 14. The second telescoping extension 22 is affixed to the first telescoping extension 20. The swivel 24 is disposed on an end of the second telescoping extension 22. The light head 12 is affixed to the swivel 24. The first telescoping extension 20 and the second telescoping extension 22 are capable of moving the head 12 from a position of contact with the case 12 to a position distal from the case 12. The head 12 is further comprised a flare 13 to aid in light dispersion from the head 12. The lens 18 is affixed to the flare 13 of the head 12.

Referring to FIG. 4, the screw cap 16 is threadably removable in fit to the second end of the case 14. At least one battery 50 slideably fits within the case 14. Various embodiments of the apparatus 10 provide cases 14 of different lengths whereby more or less batteries 50 are removably held within the case 14. The switch 26 controls battery 50 power.

Figure 5:
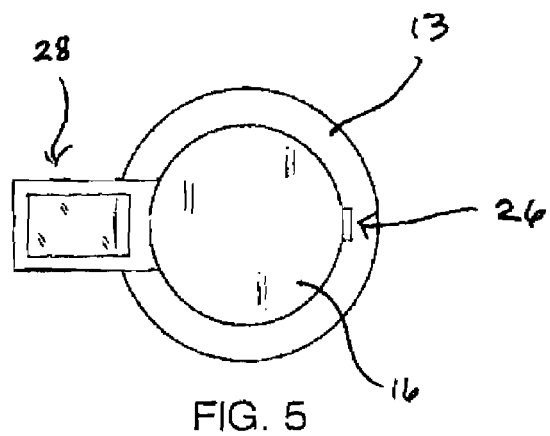
FIG. 5 is a rear elevation view, with viewer pivoted outwardly from case.

Referring to FIG. 5, the viewer 28 pivots outwardly from the case 14, with pivot assisted by the viewer tab 29.

Figure 6:
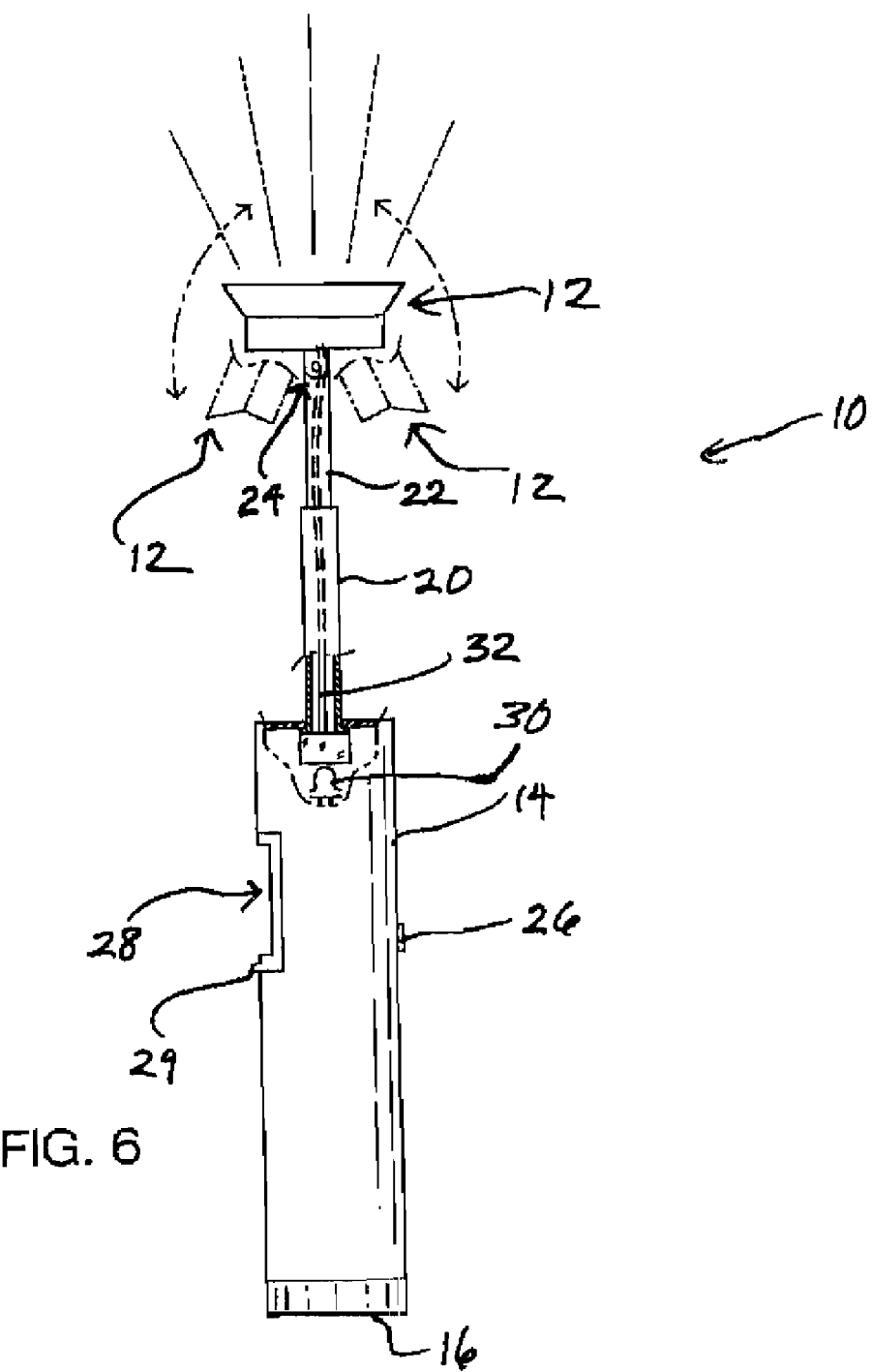
FIG. 6 is a partial cross sectional side elevation view, with head telescoped outwardly from the case.

Referring to FIG. 6, the light source 30 is disposed within the case 14. The light source 30 is proximal to the first end of the case 14. The light source 30 is in communication with the switch 26. The fiber optics 32 convey light from the light source 30 to the head 12. The fiber optics 32 discharge light from the head 12. The image receiver 34 surrounds the fiber optic 32 light discharge from the head 12. The image receiver 34 is in fiber optic 32 communication with the viewer 28 for receiving and transmitting images to the viewer 28. The lens 18 covers the fiber optic 32 light discharge and the image receiver 34. The lens 18 diffuses fiber optic 32 light for better light dispersion from the apparatus 10. The swivel 24 enables the light head 12 to pivot about 160 degrees about the swivel 24.

While, as mentioned above, other longer case 14 embodiments of the apparatus 10 are provided. The longer case 14 embodiments removably hold more batteries 50. With more battery 50 power, these other embodiments may employ higher intensity light sources 30.

With respect to the above description then, it is to be realized that the optimum dimensional relationships for the parts of the lighted telescopic viewing apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the lighted telescopic viewing apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the lighted telescopic viewing apparatus may be used.

Therefore, the foregoing is considered as illustrative only of the principles of the lighted telescopic viewing apparatus. Further, since numerous modification and changes will readily occur to those skilled in the art, it is not desired to limit the lighted telescopic viewing apparatus to the exact construction and operation shown and described, and accordingly, all suitable modifications and equivalents may be resorted to, falling within the scope of the lighted telescopic viewing apparatus.

What is claimed is:
1. A lighted telescoping viewing apparatus, comprising:
a cylindrical case having a first end, a second end, and a length therebetween;
a screw cap removably fitted to the second end;
an on/off switch on the case, the on/off switch externally accessible;
an externally accessible viewer of the case;
at least one battery removably held within the case, the battery in communication with the on/off switch;
a light source within the case, the light source proximal to the first end, the light source in communication with the switch;
a first telescoping extension affixed within the first end;
a second telescoping extension affixed to the first telescoping extension;
a swivel on an end of the second telescoping extension;
a light head affixed to the swivel, wherein the light head pivots about 160 degrees about the swivel;
fiber optics disposed from the light source to the head, the fiber optics discharging light from the head;
an image receiver surrounding the fiber optic discharging light through the head, the image receiver in communication with the viewer;
a lens covering the fiber optic light discharge and the image receiver.
2. The apparatus in claim 1 wherein the on/off switch further comprises a sliding switch.

3. The apparatus in claim 2 wherein the viewer selectively pivots outwardly from the case;

a pivot tab on the viewer.

4. The apparatus in claim 2 wherein the head is further comprised a flare on the end of the light head.

5. The apparatus in claim 4 wherein the light head flare further comprises a light diffusing lens.

6. The apparatus in claim 4 wherein the viewer selectively pivots outwardly from the case;

a pivot tab on the viewer.

7. The apparatus in claim 5 wherein the viewer selectively pivots outwardly from the case;

a pivot tab on the viewer.

8. The apparatus in claim 1 wherein the head is further comprised a flare on the end of the light head.

9. The apparatus in claim 8 wherein the light head flare further comprises a light diffusing lens.

10. The apparatus in claim 8 wherein the viewer selectively pivots outwardly from the case;

a pivot tab on the viewer.

11. The apparatus in claim 9 wherein the viewer selectively pivots outwardly from the case;

a pivot tab on the viewer.

12. The apparatus in claim 1 wherein the viewer selectively pivots outwardly from the case;

a pivot tab on the viewer.

* * * * *